July 18, 1967 D. W. WILLIAMS 3,331,650

MICROSCOPE WITH ADJUSTABLE AIMING RETICLE FOR ALIGNMENT WITH TOOL MEMBER

Original Filed Oct. 9, 1961 2 Sheets-Sheet 1

INVENTOR.
Donald W. Williams

BY Mueller & Aichele

ATT'YS.

INVENTOR.
Donald W. Williams

BY Mueller & Aichele

ATT'YS.

United States Patent Office 3,331,650
Patented July 18, 1967

3,331,650
MICROSCOPE WITH ADJUSTABLE AIMING RETICLE FOR ALIGNMENT WITH TOOL MEMBER

Donald W. Williams, Mesa, Ariz., assignor to Motorola, Inc., a corporation of Illinois Continuation of application Ser. No. 143,921, Oct. 9, 1961. This application Sept. 29, 1965, Ser. No. 491,363
3 Claims. (Cl. 350—10)

This is a continuation of application Serial No. 143,921, filed October 9, 1961, now abandoned.

This invention relates to positioning apparatus, and particularly to positioning apparatus which includes a microscope having a target finder for aiming and maintaining in aim a tool that operates on microminiature work pieces such as are employed in transistors and semiconductor diodes.

The manufacture of semiconductor devices often requires that a tool operate on a specific point on a microminature work piece. For example, in manufacturing high frequency transistors, such as those known as mesa transistors and planar transistors, it is often necessary to attach very fine wire having a diameter of approximately .5 thousandths of an inch to a tiny target area on a transistor die element. This target area may be a metallic electrode having dimensions of .0001" x .0002" or smaller. A detailed description of methods and apparatus for making such attachments is presented in Da Costa Patent No. 3,051,026 issued August 28, 1962, and assigned to the present assignee. The attachment is accomplished by maneuvering the fine wire into position over the target with a micromanipulator, and pressing the wire to the target with a bonding tool to form a thermo compression bond.

In the bonding machine described in the above mentioned patent, the bonding tool cooperates with a microscope, and the tool and microscope can be moved together by a micromanipulator mechanism. The microscope is necessary in order to view the tiny target and the fine wire. The eyepiece of the microscope contains a target finder in the form of a crossed hairline reticle, and this reticle makes it possible to aim the tool so that it will engage the target. In order to insure that the bonding tool will operate on the work piece at the point visible at the intersection of the hairlines, initial adjustments are made in the bonding tool structure until the point of operation of the tool coincides with the point of aim as represented by the intersection of the hairlines.

It has been found that over a period of time, temperature changes or vibration effects often cause the tool to drift so that the point at which the tool engages the work piece, as viewed through the microscope, deviates from the point of aim as delineated by the target finder. When this happens, the operator cannot accurately aim the tool at the desired target by operating the micromanipulator to align the intersection of the hairlines with the target. In order to bring the hairlines and the tool back into the proper relationship, it has been necessary to readjust the tool. This has been a time consuming operation which must be performed by skilled personnel, and production has been interrupted while making the adjustment, thus reducing production output from the machine.

An object of this invention is to provide an apparatus with a device for aiming a tool which performs an operation on a tiny area of work pieces, which device is adjustable to insure that the tool operates on the point at which it is aimed.

Another object of the invention is to provide a simple adjustment device whereby an operator can maintain in precise aim a tool which performs an operation on a tiny area of work pieces, thereby eliminating more complicated adjustments of the tool structure.

A feature of the invention is the provision of a target finder in an eyepiece of a microscope which is adjustable in all directions perpendicular to the optical axis of the eyepiece, the microscope and a tool being operatively connected together and movable together by a micromanipulator in performing an operation on a work piece. With this arrangement, an operator can easily adjust the target finder so as to keep the proper relationship between the tool and the target finder after the tool has drifted or otherwise deviated from its initial position, thus eliminating the necessity for difficult adjustments of the tool structure.

Referring to the drawings.

Figures 1, 2, 3:
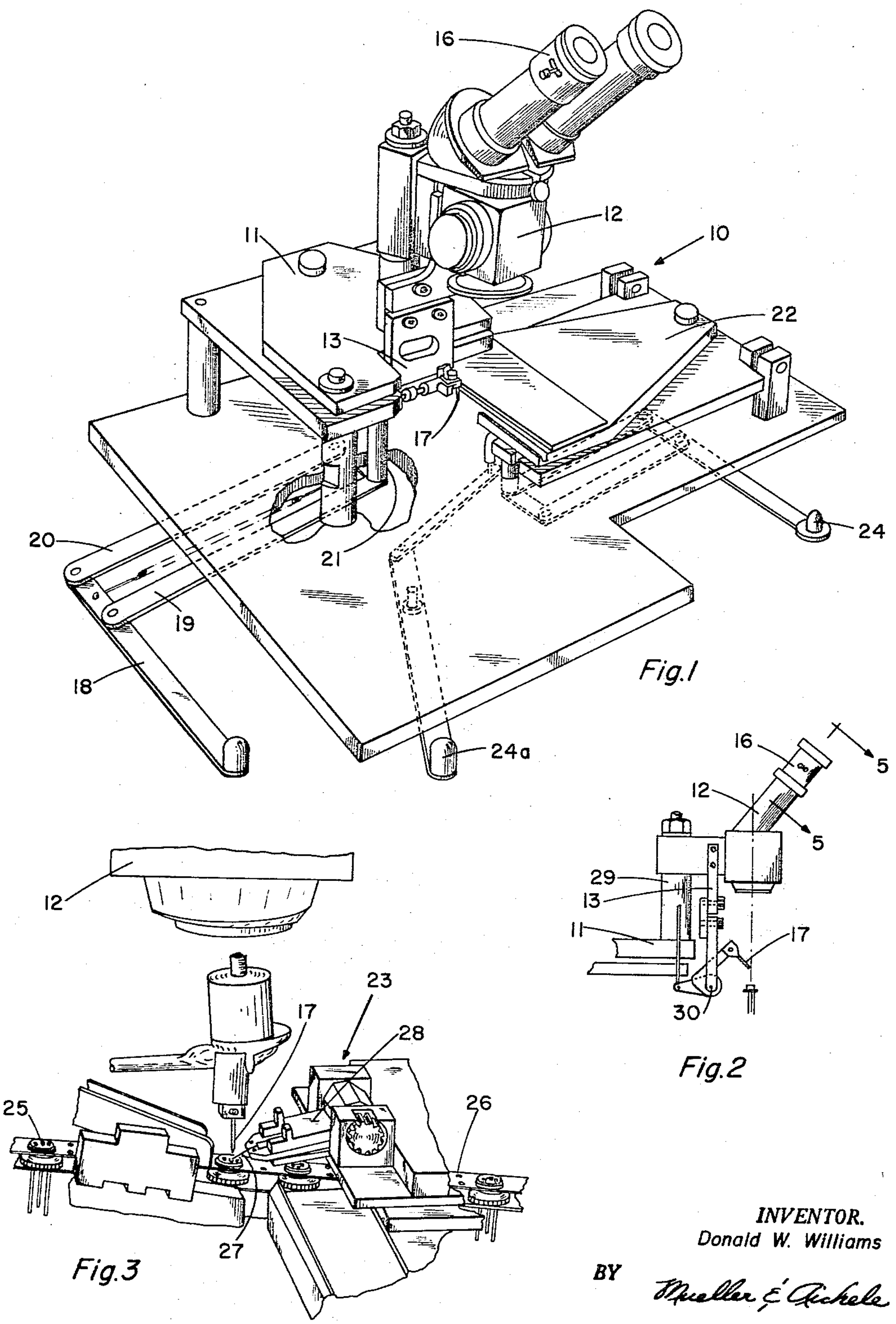
FIG. 1 is a perspective view of the micromanipulator portions of a bonding machine and also shows the tool and microscope in accordance with the invention.
FIG. 2 is a side view of a portion of the micromanipulator apparatus and shows the manner in which the microscope and tool are mounted.
FIG. 3 is an enlarged perspective view of the region within the bonding machine where the fine wires are attached to the semiconductor device.
Figure 4A:
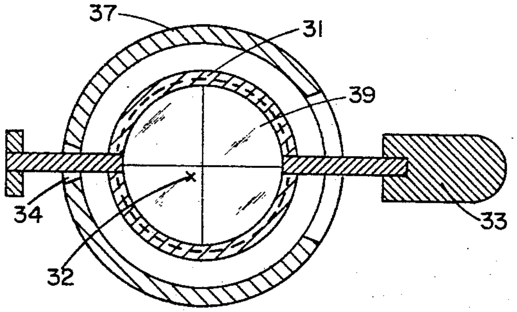
Figure 4B:
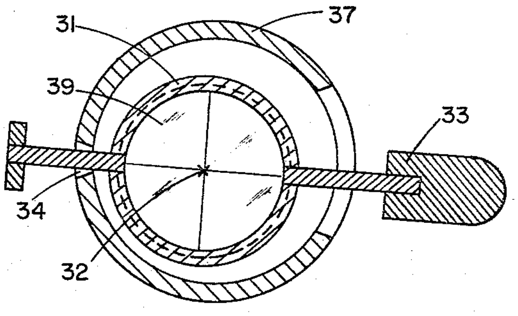
Figure 5:
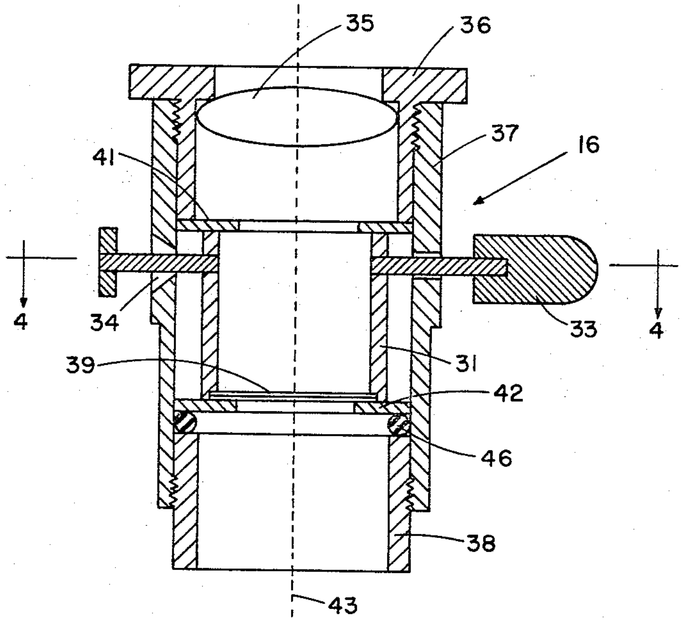

FIG. 4*a* is a sectional view taken along line 4—4 of FIG. 5 and shows the view an observer would see when looking into the eyepiece of the microscope of FIGS. 1 and 2, for the condition when the target finder is not in coincidence with the point of operation of the tool on the work piece;

FIG. 4*b* is a view which is the same as FIG. 4*a* except that the target finder is in exact coincidence with the point of operation of the tool on the work piece; and FIG. 5 is a sectional view of the eyepiece taken along line 5—5 of FIG. 2.

The apparatus of the invention includes an eyepiece containing an adjustable target finder within a microscope, which insures that a tool attached to the microscope will operate on a work piece at the exact point delineated by the target finder. Although the microscope and the tool are structurally connected, the tool may drift relative to the target finder in normal use of the apparatus. If this occurs, the point of operation of the tool on the work piece, as viewed through the microscope, will be displaced from the point of aim defined by the target finder, and in fact, the tool may completely miss the target area. In such situations, the operator can simply move the target finder into coincidence with the point of operation of the tool while looking through the microscope, and thus keep the apparatus in proper operating condition. Since the tool makes a visible impression on the work piece at its point of operation, such an adjustment is simple and can be done in a moment without requiring any particular skill. This represents a very favorable improvement over having to make tedious adjustments to the tool structure within the bonding machine housing.

In order to further describe the invention the drawings will now be discussed in detail. FIG. 1 shows micromanipulator apparatus 10 of the type described and claimed in the DaCosta patent referred to above. This apparatus contains a micromanipulator plate 11 which supports the microscope 12 and the bonding tool structure 13. The microscope has an eyepiece 16 which contains an adjustable target finder in accordance with the invention. A bonding tool 17 is mounted on the supporting structure 13, and it is this tool which performs the attachment function on a work piece. The tool 17, as well as the tool supporting structure 13 and the microscope 12, are all operatively connected together and can be moved in any direction in a horizontal plane as a result of the motion of the micromanipulator plate 11 on which they are mounted. The plate 11 can be moved to the left or right by moving the handle 18 to the left or right. The plate can be moved toward the front or back of the machine by moving the handle 18 toward the back or front of the machine. This handle is operatively connected to the plate 11 through two arms 19 and 20, a post 21, a shaft (not shown) which is inside post 21, and two non-concentric cams. One of the cams is mounted on the upper end of the post 21 and the other cam is mounted on the upper end of the shaft which is inside post 21. The action of the cams is such that they cause the plate 11 to be driven in a horizontal plane as a result of the motion of handle 18. By manipulation of the handle 18 an operator can move the microscope and the tool together into various positions over a work piece.

A second micromanipulator plate 22 supports a wire feeding apparatus 23 which is not shown in FIG. 1, but can be seen in FIG. 3. The plate 22 (FIG. 1) and the wire feeding apparatus 23 are movable in all directions in a horizontal plane by the arm 24 in a manner similar to that described for plate 11. Movement of the arm **24*a* in a direction to and from an operator will cause plate 22** to move in a vertical direction.

FIG. 3 shows a close-up view of semiconductor transistor devices 25 moving through the bonding machine. The devices 25 are carried on a belt 26, and they stop long enough under the bonding needle 17 to permit the operator to bond the fine wire 27 to a tiny target on the device. This bond is obtained as a result of force applied by the bonding tool 17 on the wire 27 as it is pressed onto the semiconductor die unit of the device. The wire feeder 23 has pivoting jaws 28 which periodically move lengths of fine wire 27 into the bonding region.

FIG. 2 shows a side view of the microscope 12, the bonding tool supporting structure 13 and the bonding tool 17. This view shows clearly the interconnection between the bonding tool, the microscope and the plate 11. The microscope is supported rigidly on the plate by the heavy post 29 but can be moved in a vertical direction in order to focus the microscope on a work piece in the bonding region. The bonding tool supporting structure 13 is connected directly to the microscope and this structure moves with the plate 11 and the microscope in all directions. The bonding tool 17 pivots about point 30 at the time it is desired to bond the wire to the device. When the tool pivots down to bond a wire to a device, it obstructs the view of the target area through the microscope, and therefore the bonding tool is preadjusted relative to the microscope in order in insure that the tool will operate at a predetermined point on the semiconductor device. Since the tool supporting structure 13 is mounted on the microscope, focus adjustments requiring vertical movement of the microscope do not change the shape and length of path of travel of the bottom end of the bonding tool. Such an arrangement keeps the tool and the microscope in the proper relationship with each other even though focus adjustments are performed.

FIG. 4*a* shows the eyepiece of the microscope in a section taken normal to the optical axis of the eyepiece, and in particular, shows the crossed hairlines which are visible to an operator when viewing a work piece through the microscope. The hairlines are on a transparent plate 39 which is secured to the cylinder 31. This cylinder can be moved laterally by operation of a handle 33. The cylinder pivots generally about the aperture 34 in the wall of outer body 37 of the eyepiece. In this view, the operator has caused the bonding tool to make an impression on the work piece at the point 32 and it can be seen that the point of intersection of the hairlines does not coincide with the point on the work piece on which the bonding tool has operated. In order to obtain coincidence between the intersection of the hairlines and the point of tool operation on the work piece, the operator, while looking through the microscope, manipulators the handle 33 to move the internal cylinder 31 until the target finder is in coincidence with the point of operation of the tool. This coincidence can be seen in FIG. 4*b*. The proper relationship between the tool and the target finder has thus been restored without readjusting the tool itself.

The entire structure of the eyepiece 16 can be seen in the sectional view of FIG. 5. The eyepiece contains a lens 35, a lens supporting member 36, an outer body 37 and a bottom plug 38. The target finder is a transparent plate 39 with crossed hairlines provided on it, and this plate is secured to the bottom end of a cylinder 31. The cylinder is held between a fixed washer 41 and a movable washer 42 and can move only in a direction perpendicular to the optical axis 43 of the eyepiece. The bottom plug 38 screws into the outer body 37 and compresses a resilient O ring 46. The O ring in turn presses on the underside of the washer 42, thus maintaining an upward pressure on the cylinder 31 which urges the cylinder against the fixed washer 41. The cylinder cannot move vertically, but an operators may move it in any direction which is perpendicular to the optical axis 43 of the eyepiece by manipulation of the knob or handle 33. Once the target finder is adjusted, it will not change its position because it is held in place by the pressure applied to it by the O ring 46. Thus, the O ring serves a retention function.

The target area on the semiconductor device to which it is desired to attach a fine wire is often of extremely small dimensions such as 1 x 2 thousandths of an inch. Before the bonding tool presses down onto the wire to make the bond it is necessary for the operator to manipulate the arms 24 and **24*a* of the plate 22 (see FIG. 1) in order to locate the fine wire 27 (see FIG. 3) at just the right position above the desired target on the semiconductor device. After this has been accomplished the operator manipulates the handle 18 of FIG. 1 and brings the target finder into exact coincidence with the desired point of bonding. The tool is then energized by means not shown, and it pivots down and bonds the wire to the exact point on the semiconductor device delineated by the target finder. Whenever it is found that the target finder no longer delineates the point at which the bonding tool operates, the operator merely adjusts the target finder by manipulation of the knob 33** of FIG. 4*a* and in effect brings the tool back into aim.

If the target finder were fixed within the body of the eyepiece, it would be necessary to employ rather difficult maintenance steps in order to correct the position of the bonding tool structure relative to the target finder. The movable target finder of this invention permits the operator to maintain the tool is precise aim and saves a great amount of time which would otherwise be required to adjust the apparatus. The usefulness of the adjustable target finder, in a microscope which cooperates with a tool, is not necessarily restricted to the bonding of tiny wires. It can be applied in any situation where a microscope is used to aim a movable member where it is necessary to precisely control the position of the member with respect to a work piece.

I claim:

1. In apparatus for positioning and aiming a tool which is adapted to perform work on an object in a predetermined work area stationarily associated with the apparatus with a portion of the object being so small as to require a viewing of the work area through a microscope while positioning the tool to a desired working position, a microscope in the apparatus including an eyepiece portion having an optical axis and a tubular wall with a circumferentially extending aperture therein, and micromanipulator means operatively connected to the microscope to move the same so that the microscope will provide a magnified view of the work area, the improvements including in combination, a target finder which has a tubular cylinder of smaller outside diameter than the inside diameter of and radially and circumferentially movably mounted inside the tubular wall and aligned with the aperture and a transparent plate on said cylinder with crossed hair lines and positioned transverse to the optical axis, said cylinder having an element extending through the aperture in the eyepiece portion wall, and being pivotally and slideably movable in radial and circumferential directions lateral to the optical axis for adjusting said target finder, adjusting means operatively connected to said element to selectively impart said lateral movements to said cylinder to provide accurate and incremental pivotal and sliding adjustments, first and second washers disposed respectively at opposite axial ends of and in intimate contact with said cylinder, a resilient O ring disposed in intimate contact with said second washer opposite said cylinder, said first washer being fixed to said eyepiece portion and said second washer being axially movable, an axially adjustable tubular plug disposed adjacent and in intimate contact with said O ring axially opposite to said second washer; said plug, O ring, first washer and second washer cooperating with said cylinder to maintain said target finder in a constant plane transverse to the optical axis of the eyepiece portion and releasably holding said target finder for lateral movements in said plane, and a tool in cooperative relation with said microscope and movable by the micromanipulator means with respect to the work area, said tool having a preadjusted positional relationship with said target finder so that said tool can be aimed relative to an object at said work area by operating said micromanipulator means to move said microscope and thereby bring said target finder into alignment with the object, said adjusting means being operative to adjust said target finder in order to compensate for deviations from preadjusted positional relationships of said tool relative to said target finder which may occur in normal operation of said apparatus.

2. For an assembly apparatus adapted to perform precise operations with a tool stationarily associated with a microscope which has tubular aiming means on its optical axis and is used to aim the tool at a work piece, the improvement including the combination for adjusting the aiming means to accurately aim the tool, a tubular eyepiece member surrounding the aiming means and having a greater inside diameter than the aiming means outer diameter and the optical axis extending axially through said member and having a pair of spaced apart apertures and one of said apertures being a circumferentially extending slot in said member with both apertures lying in one plane perpendicular to said optical axis, annular holding means including a resilient ring in said member for releasably holding the aiming means permitting accurate and incremental, radial and circumferential, pivotal and sliding movements lateral to said axis of the aiming means within said member and being open along the optical axis to permit aiming therethrough and maintaining the aiming means in a plane parallel to the plane of said apertures, and a pair of radially outwardly extending arms fixedly mounted on said aiming means and respectively extending through said apertures to the outside of said tubular member, the arm extending through said one aperture being provided with a manipulating means such that when said one arm moves there are corresponding movements imparted to said aiming means.

3. The combination of claim 2 wherein said annular holding means further comprises, first and second washers disposed in contact relation at respective axially opposing ends of said aiming means, one of said washers being axially movable and the other washer being fixedly secured to said member, said resilient ring contacting said movable washer axially opposite said aiming means, and a tubular plug connected to said tubular eyepiece member for selectively axially urging the washers toward each other.

References Cited

UNITED STATES PATENTS

| | | | |
|---|---|---|---|
| 2,166,101 | 7/1939 | Moller | 88—39 X |
| 2,825,265 | 3/1958 | Hoffmann | 88—39 |
| 2,942,345 | 6/1960 | Goldberg | 88—32 X |
| 3,051,026 | 8/1962 | Da Costa. | |

FOREIGN PATENTS

| | | |
|---|---|---|
| 544,369 | 4/1942 | Great Britain. |

DAVID H. RUBIN, *Primary Examiner.*

J. G. BOLTEN, *Assistant Examiner.*